March 1, 1966 G. HARTMAN 3,238,293

RECORDING AND EDITING APPARATUS AND METHOD

Filed June 26, 1962 2 Sheets-Sheet 1

INVENTOR.
George Hartman
BY
S. C. Yuter
ATTORNEY

RECORDING AND EDITING APPARATUS AND METHOD

Filed June 26, 1962 2 Sheets-Sheet 2

INVENTOR.
George Hartman

BY S.C. Yuter
ATTORNEY

United States Patent Office 3,238,293
Patented Mar. 1, 1966

3,238,293

RECORDING AND EDITING APPARATUS AND METHOD

George Hartman, Great Neck, N.Y.
(5 Avon Drive, Freehold, N.J.)

Filed June 26, 1962, Ser. No. 205,386
10 Claims. (Cl. 178—6.6)

This invention relates to recording and editing apparatus and to a method of editing which may utilize the apparatus in editing picture and sound film or videotape, and is illustrated particularly in its application to a method of and apparatus for simplifying the editing of videotape carrying an area of video signals and a magnetic track for the sound or audio record related to the picture.

Editing usually involves removing an unwanted length from a continuous tape and then splicing the adjacent ends of the wanted tape sections that are to be retained.

The primary object of this invention is to provide a simplified and improved method of and system for editing picture film or videotape, respectively containing a sound track on which the sound signal is recorded at a predetermined fixed spacing ahead of the related picture or the video signal.

A problem arises in such editing because of the spaced disposition of the sound or audio signal record from its related pictorial record or signal along the tape or film.

In the case of picture film, the soundtrack is recorded along the edge of the film, either by an optical or magnetic process. In the case of optical recording, modulations or varying sound frequencies are produced by varying the density of the exposure given to the soundtrack. In the case of magnetic sound recording, a magnetic soundtrack which utilizes an iron oxide compound is "striped" along the edge of the film. The magnetic sound recording is there accomplished in the same manner as is done with audio tape recording.

In the case of video tape, the soundtrack is recorded along the upper or side edge of a two inch wide magnetic tape, as the tape passes through the videotape recorder. The video portion is recorded in narrow bands transversely across the tape, and is accomplished through the use of recording heads which rotate in a plane which is perpendicular to the path of tape travel.

However, in both cases, that is, with the film and the videotape, the sound portion is recorded at some distance ahead of its associated video or picture information. In the case of 16 mm. picture and sound film this audio "lead" amounts to twenty-six frames. In the case of videotape this "lead" amounts to nine and one-quarter inches, or eighteen and one-half frames.

Thus, editing problems arise in the case of both film and videotape due to this displacement of the audio recording from the video recording. If a film containing soundtrack is cut, it will be found that the film portion preceding the cut will contain 24 frames of soundtrack which pertain to the first 24 frames of picture information which follows the cut. In other words, the film ahead of the cut contains 24 frames of sound for which there is no picture, and the film following the cut contains 24 frames of picture for which there is no sound.

The exact same situation exists with videotape, the difference being in the number of frames involved.

A solution to the problem must make possible the editing of either film or tape in such manner that sound and picture information change simultaneously at each cut.

*A conventional solution to the problem of editing film*

The film industry solved the problem of film editing by developing what is known as "double system" editing.

In this process the picture information is recorded on one film, and the soundtrack is recorded on another film of the same width, either 16 mm. or 35 mm. These are then edited with the aid of a machine known as a moviola, which makes possible the running of both sound and picture films through the machine, side by side, and frame by frame. The two films are aligned in the machine in such a manner that any sound is found to be precisely alongside its associated picture on the other film. This method is known as "Editor's Sync." If a cut is now made on both films, at the same frame number, a simultaneous cut of picture and sound will result.

After the editing is completed, the films are printed. In this step, the films are sandwiched together, with the soundtrack film properly positioned to achieve 24 frames of lead, and the resulting "sandwich" is printed onto a third film. This film is then known as a projection print.

*A typical conventional solution to the problem of editing videotape*

Heretofore, the solution to the problem of editing videotape has been sought by borrowing from the techniques of the film industry. The results have been invariably cumbersome, needlessly time consuming, and expensive to carry out.

One such system works briefly as follows:

Picture information is fed from the TV cameras to both a videotape machine and a 16 mm. film camera.

At the same time, the sound portion of the program is fed to one recording track on a magnetic recording machine which utilizes 16 mm. magnetic sound stock.

During the recording process another machine, known as the "Edit sync delayer" plays back a 16 mm. film which contains a countdown. This countdown film contains a vocal countdown by seconds, with 24 bursts of sound between each count to designate frames. This countdown is fed to the audio recording machine, to the videotape machine, and to the 16 mm. film recording machine in editor's sync. That is, a specified count such as "28 plus 4 beeps" (28 seconds and four beeps following the 28 second marker) will appear on a separate track, adjacent to the soundtrack, and opposite some specific sound on that track. For illustration, let that sound be that of a gun firing.

Playback of the countdown tape is also fed to the audio track of the videotape machine, after being delayed 18½ frames, the conventional standard separation between video signal and related audio signal on a videotape. This then means that count 28 plus 4 beeps appears precisely alongside the magnetic signal which will produce a video picture of the gun as it fires.

The countdown is delayed further to a total of 24 frames, the conventional standard separation of picture and sound on a sound film, and is fed to the 16 mm. film camera where it is recorded on the film soundtrack. Again, count 28 plus 4 beeps will appear alongside the picture frame which depicts the gun firing.

After the recording session is complete, the 16 mm. film is edited. This is done for picture continuity and the film is known as a "work print."

During editing, it is determined that the director wishes to cut to a scene just as the gun is fired. The frame showing the gun firing is located and the fact that count 28 plus four beeps appears alongside the frame is entered in the log book. This process is carried out for all the splices in the program, with all cutting points logged in the same manner.

After the editing of the film is complete, editing is begun on the soundtrack recording. In the scene in question, count 28 plus 4 beeps is found on the countdown track. This automatically locates the point at which the sound of the gun firing begins, and indicates where the cut should be made. Editing is completed on the soundtrack using the previously made log as a guide.

The same process is carried out next on the videotape. Again, count 28 plus 4 beeps is found on the countdown track, and the cutting point is known. After editing of the entire videotape is completed, again following the countdown log, the show is complete with video information on videotape, and with sound information on 16 mm. sprocketed magnetic tape. However, there is no equivalent of a projection print. To produce this, the sound track tape must be run in synchronism with the videotape, and the sound dubbed, or re-recorded onto the audio track of the videotape recording. After this step is completed, the videotape is ready for broadcasting.

The conventional system just described has many inherent disadvantages, among which are the following:

(1) A 16 mm. film must be made of all scenes recorded, negating one of the principal features of videotape, that of economy.

(2) Three separate and distinct editing processes must be carried out, requiring a great deal of time.

(3) There is always the risk of a portion or portions of the program resulting in loss of lip sync, that is, sound not occurring precisely in time with the picture.

(4) A great deal of specialized equipment is required, such as the 16 mm. film camera, the edit sync delayer, the 16 mm. magnetic sound record, special editing devices, and a special power generator supplying power to all the equipment to assure they run in synchronism.

Other editing systems presently in use have similar disadvantages which need not be detailed.

The object of the present invention is to provide a simplified method of editing, which will be explained in application to a videotape only, since the principles and operating steps will be obvious for application to motion picture film having a magnetic sound track.

Another object of the invention is to provide a modification of present conventional apparatus for processing a carrier, such as film or tape, to record a series of pictures in frames and a track of related sound signals, or to record a series of video signal lines and a track of related audio or sound signals on a tape of magnetic material. For the purpose of the present description, only the modification of an apparatus for recording videotape will be shown. The application of the pertinent principles to motion picture apparatus will then be clear to those skilled in the art.

The present invention utilizes certain features of conventional apparatus, in this case, now to be considered, a videotape recorder. Such an apparatus comprises a supply reel for a long length of magnetic tape, a receiving or takeup reel, with appropriate driving or motive means to operate the reels to transfer the tape between the reels, in a predetermined operating path, either in forward direction for recording or in reverse direction for rewinding. Various control devices for flexibility in controlling the operation of the motors are conventional and need not be considered in detail.

The tape, as it is driven forwardly through its operating path, moves past an erasing head, to clear the tape of previous signal records, then past the video recording head to receive the video signal tracks, and then past audio and cue erasing heads to clear the audio and cue track portions, and then past the audio and cue recording heads. Generally, the play-back heads are located at this location of the operating path to check the tap after the recording operation.

The spacing distance between the video recording head and the audio recording head has achieved commercial standardization, and that fact is utilized in the editing method disclosed herein.

In the editing operation, usually an intermediate unwanted section is to removed from between a forward or front wanted section to be retained and a rearward or back wanted section to be retained. The unwanted section to be removed carries an audio track signal record that is wanted. The front wanted tape section carries an audio track signal record related to the unwanted video section to be removed.

The problem is to transfer the wanted audio record from the unwanted tape section to the wanted front tape section to be retained.

Thus, a primary object of this invention is to provide a simple procedure for transferring or re-dubbing said wanted audio record from the unwanted tape section to the wanted and retained tape section in proper advanced position relative to its related video recording on the final edited tape.

To accomplish such re-dubbing, an auxiliary playback audio head is disposed at a position adjacent the operating path spaced back from the video head, with the videotape otherwise appropriately cut and temporarily spliced, as will be explained in more detail later, so the beginning of a sound track section to carry the re-dubbed audio signal length will be located at proper spacing ahead of its related video signal length on the finally edited tape.

The arrangement of the components of the apparatus and the manner in which they are utilized and employed to accomplish the editing operation, are described and explained in the following specification taken in connection with the accompanying drawings, in which FIGURE 1 shows a schematic arrangement of the component elements of a videotape recorder, modified to embody certain principles of this invention;

Figure 1:
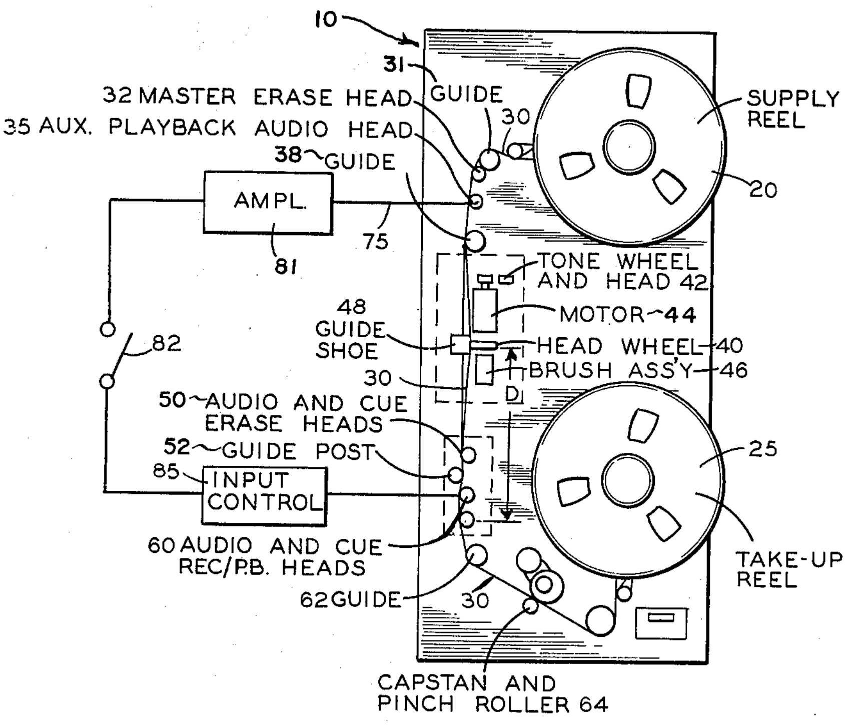

As shown in FIGURE 1, a recording and editing apparatus 10 comprises, generally, a supply reel 20 and a take-up reel 25 for transferring a tape or carrier 30 between them. Suitable motors or motive devices, omitted for simplicity, drive the supply reel and the take-up reel to move the tape 30 in the desired direction, forward or backward, through an operating path. The operating path is defined at its entrance by a guide roller 32 adjacent the supply reel 20, and proceeds to an exit guide roller 62 and an operating and driving capstan and pinch roller combination 64 adjacent the take-up reel 25.

As the videotape proceeds through the operating path, the tape passes a master erase head 34 to magnetically clean the magnetic tape, then passes an auxiliary playback audio head 35, of particular importance for the present invention, then passes another guide roller 38, and through a video head assembly comprising a video recording head wheel 40, a tone wheel and head 42, a driving motor 44 for the video head wheel 40, and a brush assembly 46 for electrical connections from the video heads and driving motor to external circuitry.

A guide shoe 48 serves to press the moving tape 30 toward the video head wheel during recording and is controlled for that purpose by conventional means.

After passing the video head 40, the videotape 30 moves past audio and cue erase heads 50, a guide post 52 and an assembly 60 of main audio and cue recording and playback heads, and then past the exit guide roller 62, previously mentioned.

The spacing between the video head wheel 40 and the audio and cue recording head assembly 60 is shown by the capital letter D. This distance has become commercially established at nine and one-quarter inches, and is utilized in the editing process disclosed herein.

The editing process involves saving and shifting or transferring a wanted audio record from a section to be cut out of the tape by re-dubbing the wanted audio record onto a wanted tape section that is to be retained. To perform the re-dubbing operation the auxiliary playback audio head 35 is employed, by sending the signal picked up by that auxiliary audio head 35 through conductors 75 to an amplifier 80 and through a switch 82, schematically shown, to the conventional input controls 85 for recording audio heads 60.

To properly utilize and locate such re-dubbing from the auxiliary playback audio head to the main recording audio head, the tape sections will be handled as will be shown and explained below for FIGURES 3 and 4.

Figure 2:
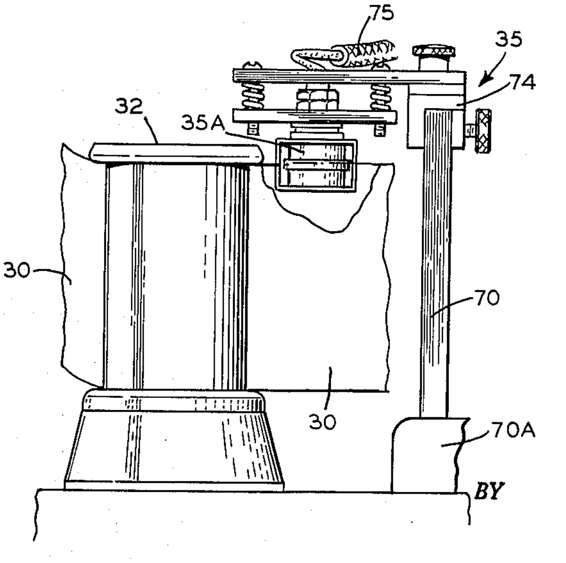
FIGURE 2 is a front elevational view of the entrance guide roller to the tape operating path and the auxiliary playback audio head employed to detect the wanted audio record to be re-dubbed in proper position on the wanted tape section by the main audio recording head of the apparatus.

The auxiliary playback audio head 35 and its disposition are shown in more detail in FIGURE 2. The audio head 35 comprises a mounting post 70 anchored on a base 70A on the common base plate of the apparatus n which the guide roller 32 is shown mounted. The post 70 supports a bracket assembly 72, 74 on which the playback head 35A is supported for three-way adjustability to position the gap of playback head 35A properly to ride against the audio track along the top border edge of videotape 30 progressing through the operating path of the apparatus. Electrical connections to the coil or coils of the magnetic auxiliary audio head 35A are indicated by cable 75, corresponding to the same conductors 75 in FIGURE 1 to amplifier 80.

The arrangement in FIGURE 2 indicates schematically how an auxiliary playback audio head assembly 35 may be applied to a videotape apparatus already in use. The related circuitry in FIGURE 1 can be applied as there shown. When the auxiliary head assembly is to be applied during original manufacture of the apparatus, the supports may be arranged so as to eliminate the need for the adjustable brackets.

Figures 3A, 3B, 4A, 4B, 4C, 4D, 4E:
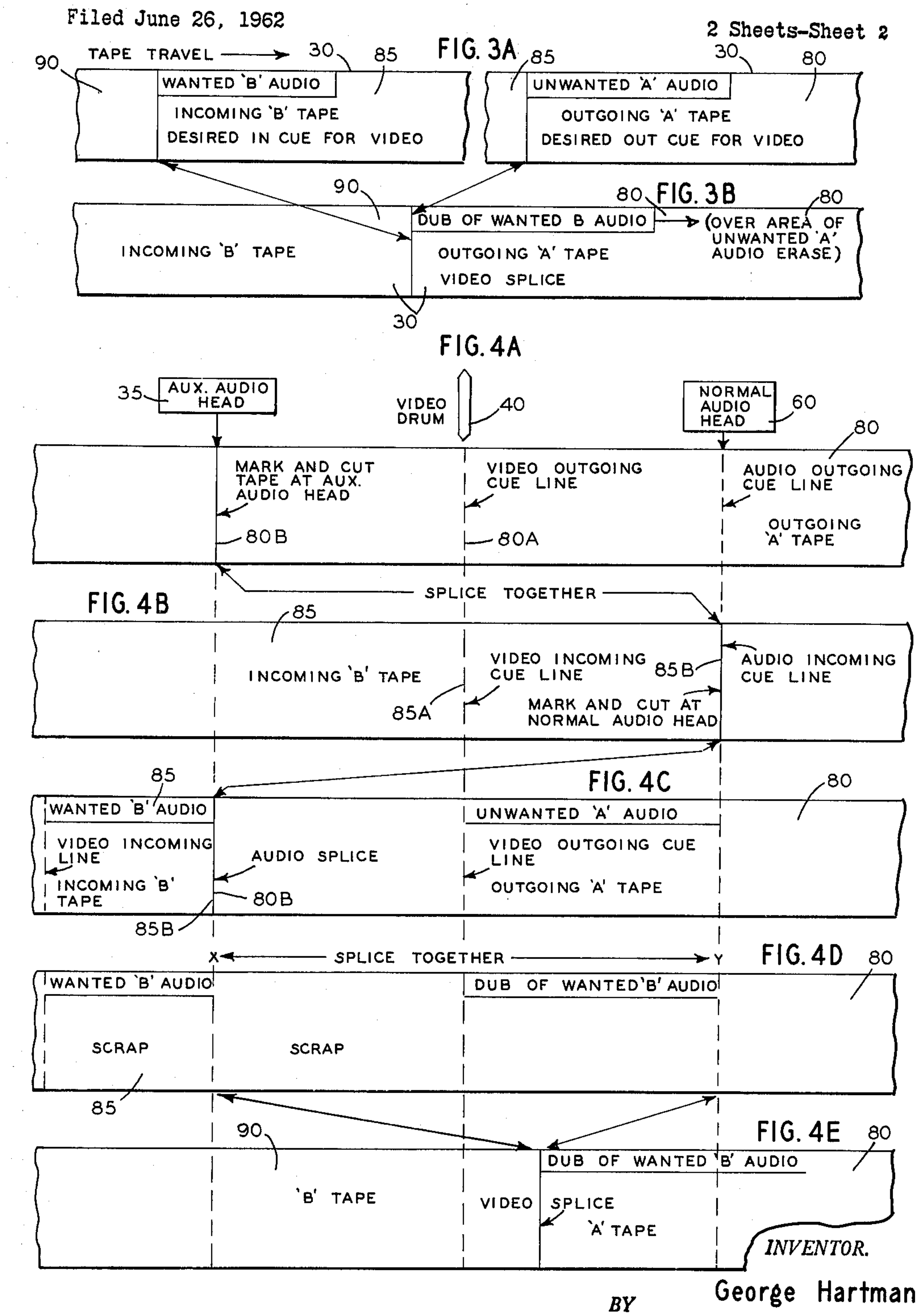
FIGURES 3A and 3B are schematic views illustrating the beginning and the end conditions in a tape to be edited to remove an unwanted section of tape, and to join or splice the two wanted sections.
FIGURES 4A to 4E are schematic views to illustrate the specific steps employed in the editing operation.

The manner in which the tape sections are to be arranged may now be considered in FIGURES 3 and 4. FIGURE 3A shows two wanted tape sections 80 and 90 that are to be spliced together, and an unwanted section 85 that is to be removed. FIGURE 3B shows the two tape sections 80 and 90 spliced after the editing operation, with the unwanted section out.

FIGURES 4A to 4E show the detailed steps of the editing operation.

Cue marks for video and for audio for identification of the cutting lines for guiding the editing operation are placed on the tape according to the direction and selection of a supervisor.

*Procedure*

(1) As shown in FIGURE 4A, the "A" tape 80 is positioned in the machine so that the video outgoing cue line 80A is located at the line of the video head 40. With the tape so positioned, it is marked and cut on line 80B at the auxiliary audio playback head 35.

(2) The "B" tape 90 is similarly positioned in the machine with the video incoming cue line 85A located at the video head line, as in FIGURE 4B. With the tape so positioned, it is marked and cut at the line 85B at the normal audio head 35.

(3) The "A" and "B" tapes 80 and 90 are spliced together, as in FIGURE 4C, without regard for picture continuity. The tape is then threaded to position this splice at the line of the auxiliary playback head 35. It will be noted that this splice marks the beginning of the audio to be dubbed to the "A" tape 80. It will also be noted that the point at which the dub should begin on the "A" tape is automatically positioned at the normal audio head 60.

(4) The audio is now dubbed through the amplifier 81 and input controls 85, as in FIGURE 1. To do this, the conventional audio only button is pressed, and the reels hand turned for a distance of 10 to 12 inches, or until the previously made audio splice has passed through the video head assembly. Hand turning the reels permits precision in establishing the point at which the dubbing begins, and is possible due to the fact that the playback and record tapes are "locked" together in speed. The result is shown in FIGURE 4D.

(5) It remains only to splice the tapes together on a video basis, at common audio points "$x$" and "$y$" as shown in FIGURES 4D and 4E. The remaining tape 85 between these two points now becomes scrap and may be discarded.

By use of the process described, it is possible to utilize the fixed dimensions of the recording machine as guides and aids to expedite the editing procedure. It is not necessary to resort to external measuring devices and the like to establish the dimensional relations and spacings between cue lines as guides in the cutting operations.

Where conventional videotape recorders are already in commercial operation, they may be easily modified and converted to embody the present invention by the addition and placement of an auxiliary playback audio head, such as the head 35 herein, and appropriate amplifier circuitry provided to feed the signal detected at the auxiliary audio head to operate the input controls to the main audio record head.

The same principles obviously may be applied to editing picture film with magnetic sound track.

The invention is therefore not intended to be limited to videotape apparatus and editing, nor to the apparatus as shown, since modifications may be made within the invention without departing from the spirit and scope of the invention as set forth in the claims.

What is claimed is:

1. The method of editing a television recording or videotape having a body portion carrying recorded picture signals and a border edge portion carrying sound signals related to the recorded picture signals, on a television recording machine for recording sound signals and picture signals on a videotape by an audio signal head and a picture signal device, the audio signal head being physically spaced in advance of the picture signal device, and by means of which the sound signals are recorded on the border portion and spaced a predetermined fixed distance in advance of the related picture signals, such method of editing being to remove a selected undesired portion of picture signal tape disposed between a forward outgoing retained tape section and a rearward incoming retained tape section, and transferring the desired sound recording from the portion to be removed onto the forward portion to be retained, and such method including the step of cutting the tape at the leading edge and at the lagging edge of the body portion to be removed, and the step of transferring the sound signal from such to-be-removed portion onto the border edge portion of said forward outgoing retained tape section at a location spaced said predetermined fixed distance in advance of the related picture signals on the rearward incoming retained tape portion, and the step of removing said undesired portion, and the step of then splicing the front cut edge of the rearward incoming retained tape section to the back cut edge of the forward outgoing retained tape section.

2. In the process of editing a recorded television tape directly on a video recording machine having a video recording head and a normal audio recording head disposed a fixed distance in advance of said video head, and on which the picture signals are recorded on the main body portion of the tape, and the related audio or sound signals are recorded along one edge border portion, with the audio signals disposed on the border portion a predetermined fixed distance in advance of the related picture signals on the body portion of the tape, and in which editing operation a complete strip portion of the tape is to be removed from between a leading cut line of such desired-out portion at the back end of a forward outgoing retained tape section and a lagging cut line of such desired-out portion at the front end of a rearward incoming retained tape section, the method of performing such editing operation which includes the step of positioning the forward desired-in tape section with its video outgoing cue line aligned with the video recording head and cutting said tape on a line spaced behind the video recording head at a distance equal to said fixed distance of said normal recording audio head, the step of then positioning the rearward desired-in tape section to place the desired audio incoming cue line in alignment with the normal audio recording head and cutting said tape on said line, the step of then temporarily splicing the two tapes along said cut lines, the step of then moving the spliced tape through the recording machine while dubbing the sound record starting from the desired audio incoming cue line on the rearward tape onto the sound track edge border portion of the forward outgoing tape portion for the distance of said fixed spacing between said video head and said sound recording head, then the step of cutting the rearward incoming tape on the video incoming cue line of the wanted video portion to leave a free portion of said rearward incoming tape spliced to the forward outgoing tape portion, then opening the temporary splice to remove said free portion, and finally the step of splicing the forward outgoing retained tape section to the rearward incoming retained tape section with the two cut line edges congruent.

3. The method of editing a videotape directly on a video recording machine and a normal audio recording head disposed a fixed distance in advance of said video head, and which tape has a body portion carrying recorded video signals and a border edge portion carrying recorded sound signals related to the recorded video signals but spaced on the videotape said fixed distance in advance of such related video signals on said tape, with suitable video cue signals recorded in the video portion and audio or sound cue signals recorded in the border edge portion of the tape, said method comprising the following steps:

(1) locating an audio cue and its related video cue on the forward or outgoing section of tape that is to be retained, and cutting the tape a short distance behind the video cue location in a portion to be scrapped in said forward tape section;

(2) locating the audio cue for the wanted advance audio signal to be retained and which is disposed in said tape portion to be scrapped and which relates to the video portion of the subsequent tape section to be retained;

(3) splicing the two tape sections and transposing and dubbing the wanted advance audio signal of the subsequent incoming tape section onto the sound signal border edge portion of the forward outgoing tape section that is to be retained so such dubbing will be in proper position for the related video portion; and (4) then cutting out the tape portion from which the dubbed audio portion was transferred and then splicing the wanted forward tape section to the subsequent wanted tape section.

4. The method of editing videotape having a video signal body portion and an audio signal border edge portion spaced in advance of the related video signal portion, with video and audio cue signal marks recorded at appropriate places on the videotape, on a videotape recording machine having a video recording head and an audio recording head spaced a conventionally standard fixed distance in advance of the video recording head in the direction of tape travel through the machine, said method comprising the operating step of moving the videotape through the recording machine and transferring and dubbing a recorded audio signal length from a position on a selected portion of the videotape, that is to be discarded and removed by the editing operation, to proper operating position on a portion of the videotape that is to be retained, by detecting the audio record from said moving tape and transferring the audio detection signal from said audio record directly to the audio recording head for reproduction on said videotape.

5. The method as in claim 4, including the preliminary steps of cutting a forward first tape section to establish a first temporary splicing edge line at an arbitrary fixed auxiliary distance behind a first front video cue line of a section to be removed by the editing operation;

also cutting a second temporary splicing edge line on a second tape section at said conventional standard fixed distance in advance of a second front video cue line of a section of the videotape to be retained after the editing operation;

joining the two tape sections at said first and second temporary splicing edge lines;

and then performing said dubbing operation of transferring the audio signal from the space on said second tape section between the splice line and said second front video cue line on said second tape onto the audio border space on said first tape section within the space in advance of said first front video cue line corresponding to said conventional standard fixed distance.

6. The method as in claim 5, including additional subsequent steps, after the said dubbing operation, said subsequent steps including cutting the first or forward tape section on the first front video cue line, cutting the second tape section on the second front video cue line, for eliminating the section to be removed, and then splicing the two tape sections at said first front and said second front video cue lines.

7. Videotape basic main recording apparatus and co-ordinated auxiliary editing apparatus in which the basic main recording apparatus comprises a tape supply reel;

a tape take-up reel;

guides for defining a path to be traversed between an entrance and an exit by a tape in movement between the two reels;

a normally employed erase head at the entrance to said path to erase a tape for recording;

a normally employed video recording head disposed at said path in advance of the erase head for recording video signals on said tape;

normally employed audio and cue recording heads disposed at said path in advance of said video recording head by a fixed distance corresponding to a conventionally standard spacing representing the spacing between a video signal and the related audio signal, for recording cue-locating signals and audio signals on said tape;

fixed input normally employed recording controls of the basic recording apparatus for selectively energizing said video and audio heads;

and said co-ordinated auxiliary editing apparatus comprises means including an auxiliary normally non-employed playback audio head disposed at said path at a location behind the video head for detecting a wanted audio record on an unwanted selected length of tape, and for reproducing said wanted audio record as a signal, and for then transmitting such signal directly through said normally employed input recording controls to selectively energize the normally operating audio recording head of the basic main apparatus to dub the detected wanted audio record from the unwanted tape section at said location behind the video head onto an unwanted tape section moving past the normally employed audio recording head of the apparatus, whereby the forwardly dubbed wanted audio recording will be saved from an editing operation performed to remove the unwanted section of the videotape which originally carried such wanted audio recording in advance of its related video recording, which wanted audio recording is to be retained after the editing operation.

8. Main recording and auxiliary editing apparatus comprising main means for transporting a videotape through an operating path having a forward direction and a backward direction;

main normally employed video head means disposed adjacent said path for recording video signals on said tape;

main normally employed audio head means for recording audio signals on an audio track on said tape and disposed at a location adjacent said path a standard fixed distance in advance of the video head means in the forward direction;

an auxiliary normally non-employed playback audio head disposed at a location adjacent said path behind said video head to detect and generate an audio signal from a selected portion of said audio track;

and means for employing said auxiliary playback audio head to detect and generate such audio signal and for transmitting such generated audio signal directly to said main audio recording head means for dubbing or re-recording said detected audio record onto an audio track portion traversing said main audio head recording means.

9. Recording and editing apparatus, as in claim 8, having input control means normally employed for controlling the energization of the main audio recording head means during operation of the recording means;

and means for selectively connecting said auxiliary playback head means to said main audio recording head means through said control means to energize said main audio head means for effecting said dubbing operation.

10. Apparatus for modifying a videotape recording machine having a normally employed video recording head, a main normally employed audio recording head disposed in spaced relation in advance of the video recording head, and said main input control means normally employed to control the energization of the main audio recording head, such modifying apparatus serving to permit the recording machine to be utilized to perform an editing operation directly thereon, and such modifying apparatus comprising an auxiliary normally non-employed playback audio head to be disposed in position adjacent the path of travel of an audio track of a videotape at a location displaced backward from said main video head and to detect the record on the audio track of said video tape and to generate an audio output signal therefrom;

an amplifier for the output signal from said auxiliary playback audio head;

and means for selectively connecting the amplifier output to the input controls of the machine to energize the main audio recording head to perform a dubbing step as part of the editing operation.

References Cited by the Examiner

UNITED STATES PATENTS 2,952,737 9/1960 Friess ______________ 178—6.6

FOREIGN PATENTS 1,027,404 2/1953 France.

OTHER REFERENCES

Video Tape Recording: Bernstein, J.; John F. Rider Publishers, Inc., New York, 1960, pages 254–255.

DAVID G. REDINBAUGH, *Primary Examiner.*